United States Patent [19]
Brown

[11] 4,381,232
[45] Apr. 26, 1983

[54] MULTI-STAGE ELECTRODIALYSIS STACK ELECTRODE REVERSAL SYSTEM AND METHOD OF OPERATION

[75] Inventor: Douglas R. Brown, Arlington, Mass.

[73] Assignee: Ionics, Incorporated, Watertown, Mass.

[21] Appl. No.: 295,412

[22] Filed: Aug. 24, 1981

[51] Int. Cl.³ ............................................. B01D 57/02
[52] U.S. Cl. .................. 204/180 P; 204/301
[58] Field of Search ............................ 204/180 P, 301

[56] References Cited
U.S. PATENT DOCUMENTS
3,029,196  4/1962  Matz et al. ...................... 204/180 P
3,341,441  9/1967  Giuffrida et al. ............... 204/180 P

*Primary Examiner*—John F. Niebling
*Attorney, Agent, or Firm*—Norman E. Saliba

[57] ABSTRACT

An improved electrodialysis stack electrode reversal system and method of operation is disclosed in which each of the electrode pairs forming an electrical stage in such stack are reversed on a sequential stage by stage basis. The sequential reversal is timed to occur in each of the series connected stages as the desired dilute product stream clears the stage substantially decreasing the amount of loss of partially treated product.

7 Claims, 2 Drawing Figures

CSM = CONDUCTIVITY SENSING MEANS

MULTI-STAGE ELECTRODIALYSIS STACK ELECTRODE REVERSAL SYSTEM AND METHOD OF OPERATION

BACKGROUND OF THE INVENTION

1. Field of the Invention

The invention relates to electrodialysis fluid treatment systems and is more particularly directed to electrode reversal in such systems.

2. Description of the Prior Art

Electrodialysis fluid treatment systems arranged in a stack configuration of a plurality of series connected, progressively purifying stages, are well known in the prior art. See, for example, U.S. Pat. No. 4,172,779, Yamaguchi, et al. Polarity reversal of the electrodes within the stages to prevent the buildup of scale is also well know. See, for example U.S. Pat. Nos. 2,694,680, Katz, et al., 2,863,813, Juda et al., and 3,341,441, Giuffrida et al., which fully illustrate the prior art and are hereby incorporated by reference.

In the present day operation of such stacks, electrode polarity reversal is an accepted technique which is effected up to several times per hour in a continuous cycle. As reversal is presently employed, all stages and all electrodes are changed at once. The character of the dilute product stream is also immediately changed upon reversal resulting in the contamination of partially desalted product in each stage. For instance, in a ten stage salt removal unit, the product contained in the final three or four stages is substantially desalted yet, upon reversal, the desalted or dilute stream now begins receiving the contaminated or salt concentrate material. As a result, the entire stack volume of product, whether partially desalted or not, must be discarded upon reversal with a consequential reduction in overall unit efficiency.

In contract to the prior art, it has now been discovered that the above described product loss may be avoided by sequentially changing the polarity of the electrodes stage by stage on a timed staggered basis. Reversal occurs in each electrical stage after the partially desalted product generated by that stage has worked its way through or cleared the hydraulic channels of the stage. Thus the great majority of product which has been partially desalted in the initial stages of the system will continue through the system without salt contamination and emerge in a completely usable state.

SUMMARY OF THE INVENTION

The invention may be summarized as both the apparatus for and method of performing electrode reversal in a series of connected multi-stage electrodialysis system. The system is normally comprised of a plurality of electrical stages, each progressively purifying the product of the previous stage until the desired purity of product is reached. Each electrical stage may in turn contain one or more hydraulic stages as is well known in the art. Electrode reversal is periodically carried out to descale the system. In the present invention, the reversal is conducted stage by stage on a descending basis in order of salt content of the product or diluting stream, i.e., from upstream to downstream with respect to raw material input. The reversal takes place on a staggered, time-delayed basis determined by the current, salt content and rate of fluid flow through the stack. As the dilute or treated product clears each stage, the electrodes of that stage are reversed until all stages in the system have been reversed. The product streams are then rerouted as in conventional reversal practice.

By this method, only the partially desalted product of the first stage will be wasted instead of all the fluid in the system, as is the case when all stages are reversed simultaneously. Reversal may be timed to occur based upon the known fluid flow rate of the system or alternatively, conductivity measurements can be used at the output of each stage to determine the state of the product.

These and other features and advantages of the invention will become more evident from the description of the preferred embodiment and the drawings which follow.

DESCRIPTION OF THE PREFERRED EMBODIMENT

Figure 1:
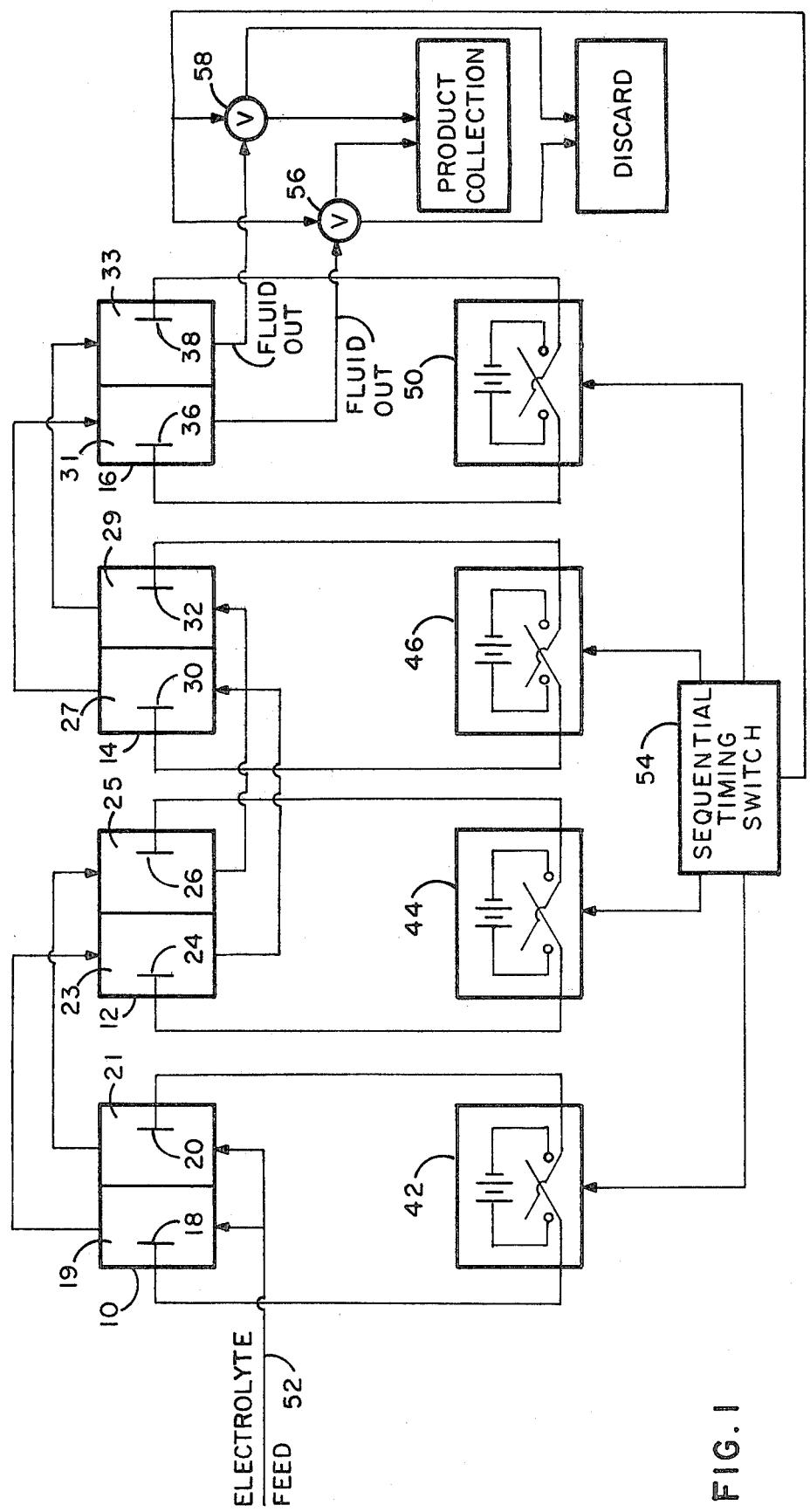
FIG. 1 is a schematic representation of the preferred embodiment of the invention.

Referring to FIG. 1, an electrodialysis fluid treatment system is schematically illustrated. The system is comprised of four electrical stages 10, 12, 14 and 16. Stage 10 contains electrodes 18 and 20 and is divided into salt diluting and salt concentrating compartments 19 and 21. Stage 12 contains electrodes 24 and 26 and is also divided into salt diluting and salt concentrating compartments 23 and 25. Stage 14 contains electrodes 30 and 32 and is also divided into salt dilute and salt concentrating compartments 27 and 29. Stage 16 contains electrodes 36 and 38 and is also divided into salt dilute and salt concentrating compartments 31 and 33. The compartments are shown schematically. In practice each stage is formed by a plurality of alternating anion and cation selective membranes which act to selectively transfer ions by electrolytic action, thus forming alternating salt diluting and salt concentrating compartments.

As is well known, each stage in actual practice will contain a large number of such alternating cation and anion permeable membranes forming a plurality of like connected alternating salt diluting and salt concentrating chambers. The nature of the chambers (i.e., desalting or concentrating) will alternate depending upon the polarity of the electrodes to which are applied reversible power sources 42, 44, 46 and 50. The stages are connected hydraulically in series, like chamber to like chamber, in accordance with the electrical polarity, which, in regular continuous operation, is congruent from stage to stage.

The raw fluid material, i.e., electrolyte, is introduced into the system at stage 10 through pipe 52 and is then progressively treated from stage to stage until it emerges from stage 16 as two separate streams, i.e., a substantially desalted purified product and a salt concentrated waste. The chamber from which each emerges depends upon the particular momentary polarity of the electrodes.

As has been discussed, the prior art method for the purpose of descaling has been the simultaneous electrode reversal of all stages. it will be seen that when such is carried out, the partially refined products contained in all stages will immediately begin to be contaminated with salt. As a result, all of the effluents must be discarded until the entire system's fluid content has worked its way through all of the stages.

In the present invention, a means for sequentially switching the polarity of each stage on a staggered time delayed basis is provided by, for example, timing switch 54. The timer may be either a mechanical or electrical solid-state type. In operation, the polarity of stage 10 is reversed at a time according to the descaling requirements of the system. The dilute chambers of stage 10 will begin to concentrate but those of stages 12, 14, and 16 will not. At a successive point in time, determined by the systems flow rate, the concentrate stream emanating from stage 10 will fill the dilute side of stage 12 as the last of the dilute product produced by that stage clears the stage. The polarity of stage 12 is then reversed, stages 14 and 16 continuing in the unreversed state. This process is repeated for stage 14 and 16 allowing a time lapse based on similar flow rate. At the conclusion of the staggered polarity reversal, valves 56 and 58 are activated to rechannel the streams emerging from the final step 16.

Figure 2:
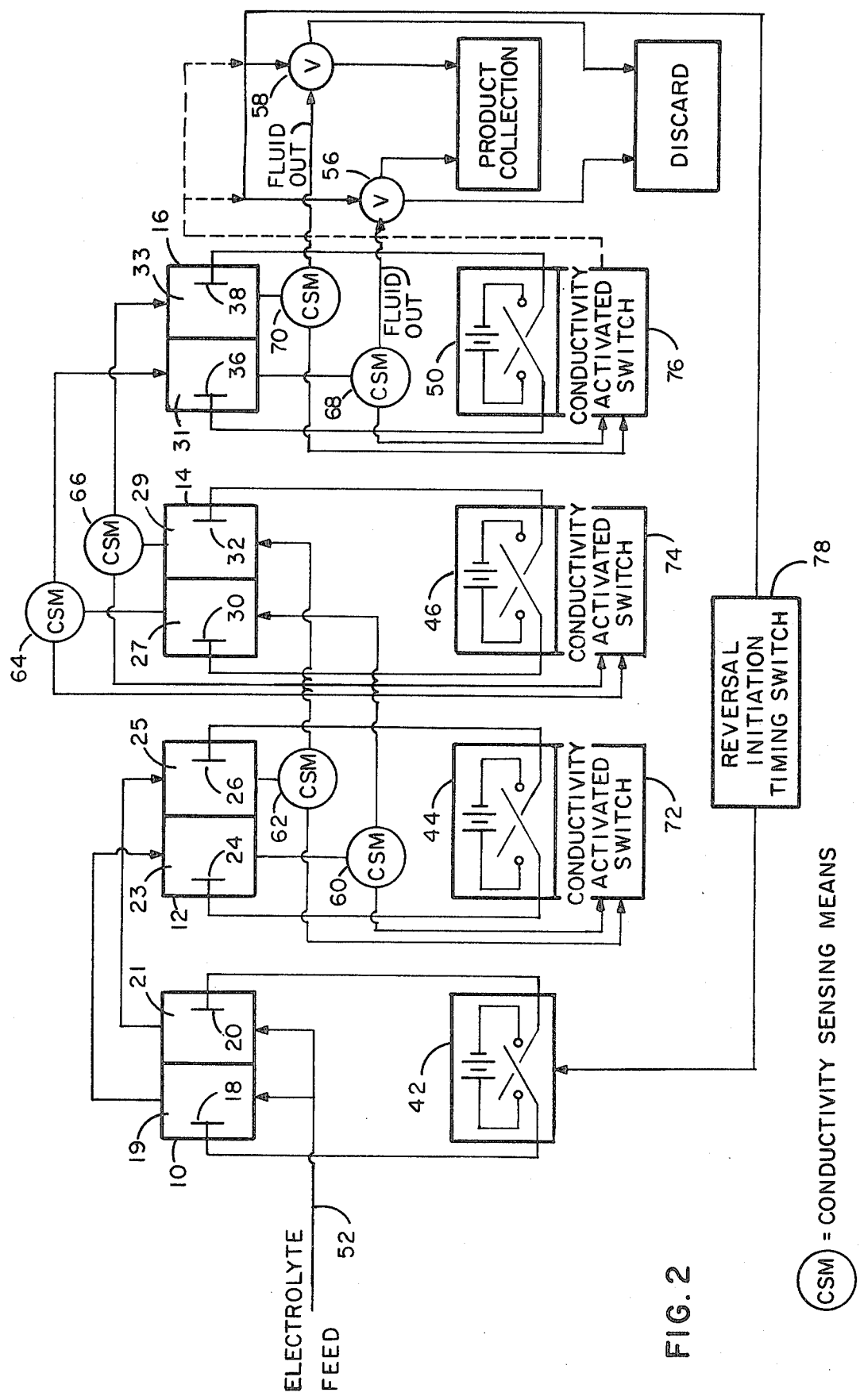
FIG. 2 is a schematic representation of an additional embodiment of the invention.

Referring to FIG. 2, a stack system similar to that of FIG. 1 is shown. Like components are identified by like numbers. The sequential timing switch is here replaced with a plurality of conductivity detecting devices 60, 62, 64, 66, 68 and 70, placed in the exit stream of each stage. Suitable devices for this purpose are well known in the art. The output of each conductivity detector is fed to conductivity activated switches 72, 74, and 76 which may be programmed to achieve polarity reversal of each stage similar to the action of sequential timing switch 54 in the above described embodiment. The switches are designed to activate at either high or low conductivity which occurs as the nature of the stream changes due to progressive flow of reversal produced fluid from stage 10. Reversal of stage 10 is initiated on a repetitive, time basis by a simple timing switch 78.

Activation of valves 56 and 58 to rechannel the fluid streams emerging from final stage 16 may be controlled by switch 78 or alternatively by conductivity detectors 68 and 70.

The following comparative examples set forth the specific embodiment of the instant invention.

EXAMPLE I

Process Without Phased Reversal

In this example an Aquamite ® XX electrodialysis unit (system) was employed using direct electric current to desalt 10,000 ppm salt water to a 300 ppm product water. The system containing 4 multi membrane stacks having two electrical stages in each stack are commercially obtainable from Ionics, Incorporated of Watertown, MA. The system with its eight stages hydraulically connected in series flow was operated at a solution flow velocity equivalent to an exposure time for the dilute (product) stream in each stage of 25 seconds or a total exposure time in the 8 stage membrane array of 3.28 minutes. Upon polarity reversal of the direct current, the period of "off spec." time was 3.4 minutes which is the time required for complete passage of the dilute (product) stream through the 8 stages including ancillary piping. The "off spec." time is the non-productive time when no desalted product water is being recovered.

EXAMPLE II

Process Using Phased Reversal

The electrodialysis system of Example I was modified to incorporate stage by stage polarity reversal using timing relays which separately control the reversal of each of the eight individual electrical stages. Reversal was initiated with the first stage and thereafter each subsequent downstream stage was reversed after all of the partially desalted water had been expelled from that stage. Each stage was reversed 25 seconds after the previous stage had reversed. The total "off spec." time for the system was reduced to the time required for the dilute stream to pass through one stage only including ancillary piping, namely about 30 seconds as compared to the 3.4 minutes of Example I.

This invention has been described with reference to specific preferred embodiments thereof, but it is contemplated that modification thereto will occur to those skilled in the art, and that such modifications may be made without departing from the scope of the invention.

The embodiments of this invention in which an exclusive property or privilege is claimed are defined as follows:

1. In a multi-stage electrodialysis fluid treatment system comprised of a plurality of series connected stages, each stage arranged to further desalt the dilute product stream output of the previous stage, each stage composed of an anode and a cathode separated by at least one cell pair of salt diluting and salt concentrating chambers defined by alternating anion and cation permselective membranes, each stage connected to its associate stages by fluid passage means for each of the dilute and concentrated product streams generated by said stages, each stage further having polarity reversing means for periodically changing the polarity of said electrodes, said system further having fluid passage control means for directing the flow of said dilute and concentrated product streams, the improvement which comprises switching means for sequentially activating said polarity reversing means stage by stage on a time staggered basis in order of the dilute product salt content.

2. The apparatus of claim 1 wherein said switching means comprises a timer.

3. The apparatus of claim 1 wherein said switching means comprises in combination:
   a. a plurality of conductivity sensing means positioned one each in the fluid passages at the output of each stage; and
   b. a plurality of separate switching means one for each of said polarity reversing means, each of said separate switching means responsive to at least one of said conductivity sending means.

4. In the method of operating a multi-stage electrodialysis fluid treatment system comprised of a plurality of series connected stages, each stage arranged to further desalt the dilute product or stream output of the previous stage, each stage composed of an amode and a cathode separated by at least one cell pair of salt diluting and salt concentrating chambers defined by alternating anion and cation permselective membranes, each stage connected to its associate stages by fluid passage means for each of the dilute and concentrated product streams generated by said stages, each stage further having polarity reversing means for periodically changing the polarity of said electrodes, said system further having fluid passage control means for directing the flow of said dilute and concentrated product streams, the improvement which comprises the step of sequentially activating said polarity reversing means stage by stage on a time staggered basis in order of the dilute product salt content.

5. The method of claim 4 further including the step of activating said fluid passage control means simultaneously with the last of said polarity reversals to redirect the flow of said dilute and concentrated product streams.

6. The method of claim 4 wherein said stage by stage activation occurs at pre-selected time intervals.

7. The method of claim 4 wherein said system further comprises a plurality of conductivity sending means positioned one each in the fluid passages at the output of each stage and said method further includes the step of activating said polarity reversing means in response to said conductivity sensing means.

* * * * *